(12) United States Patent
Montojo et al.

(10) Patent No.: US 9,496,978 B2
(45) Date of Patent: Nov. 15, 2016

(54) SCRAMBLING SEQUENCE INITIALIZATION FOR COORDINATED MULTI-POINT TRANSMISSIONS

(71) Applicant: QUALCOMM Incorporated, San Diego, CA (US)

(72) Inventors: Juan Montojo, San Diego, CA (US); Tao Luo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 14/549,898

(22) Filed: Nov. 21, 2014

(65) Prior Publication Data

US 2015/0103807 A1    Apr. 16, 2015

Related U.S. Application Data

(62) Division of application No. 12/893,949, filed on Sep. 29, 2010, now Pat. No. 8,923,905.

(60) Provisional application No. 61/247,114, filed on Sep. 30, 2009.

(51) Int. Cl.
*H04B 7/216* (2006.01)
*H04J 13/10* (2011.01)
(Continued)

(52) U.S. Cl.
CPC ............ *H04J 13/10* (2013.01); *H04B 7/024* (2013.01); *H04J 11/0053* (2013.01)

(58) Field of Classification Search
CPC ...................................... H04B 1/707

USPC ......................................................... 370/335
See application file for complete search history.

(56) References Cited

U.S. PATENT DOCUMENTS 5,887,262 A    3/1999    Willhoff
7,443,875 B2    10/2008    Okuyama
(Continued)

FOREIGN PATENT DOCUMENTS

CN    1339888 A    3/2002
CN    1618195 A    5/2005
(Continued)

OTHER PUBLICATIONS

3GPP: "3rd Generation Partnership Project, Technical Specification Group Radio Access Network, Evolved Universal Terrestrial Radio Access (E-UTRA), Physical layer procedures (Release 8)" 3GPP Draft, DRAFT36213-880, 3rd Generation Partnership Project (3GPP), Mobile Competence Centre , 650, Route Des Lucioles , F-06921 Sophia-Antipolis Cedex , France, Sep. 1, 2009, XP050388082.
(Continued)

*Primary Examiner* — Shripal Khajuria
(74) *Attorney, Agent, or Firm* — Steven A. Raney

(57) ABSTRACT

Methods, systems, apparatus and computer program products are provided for generating a shared initialization code for physical channel data scrambling in an LTE Advanced coordinated multipoint transmission network. This Abstract is provided for the sole purpose of complying with the Abstract requirement rules that allow a reader to quickly ascertain the disclosed subject matter. Therefore, it is to be understood that it should not be used to interpret or limit the scope or the meaning of the claims.

48 Claims, 10 Drawing Sheets

(51) Int. Cl.
*H04B 7/02* (2006.01)
*H04J 11/00* (2006.01)

(56) References Cited

U.S. PATENT DOCUMENTS

| | | | |
|---|---|---|---|
| 7,734,979 | B1 | 6/2010 | Jones et al. |
| 8,369,429 | B2 | 2/2013 | Koo et al. |
| 8,634,362 | B2 | 1/2014 | Montojo et al. |
| 8,923,905 | B2 | 12/2014 | Montojo et al. |
| 8,948,097 | B2 | 2/2015 | Chen et al. |
| 2002/0138721 | A1 | 9/2002 | Kwon et al. |
| 2002/0191562 | A1 | 12/2002 | Kumaki et al. |
| 2003/0169702 | A1 | 9/2003 | Ryu et al. |
| 2004/0032857 | A1* | 2/2004 | Tannan ............ H04W 24/00 370/351 |
| 2005/0018703 | A1 | 1/2005 | Blasco et al. |
| 2008/0285433 | A1 | 11/2008 | Akita et al. |
| 2009/0036168 | A1 | 2/2009 | Nawata et al. |
| 2009/0132675 | A1 | 5/2009 | Horn et al. |
| 2009/0136034 | A1 | 5/2009 | Gaal et al. |
| 2009/0238064 | A1 | 9/2009 | Lee et al. |
| 2009/0268910 | A1 | 10/2009 | Liu et al. |
| 2010/0041350 | A1 | 2/2010 | Zhang et al. |
| 2010/0062783 | A1* | 3/2010 | Luo ................ H04J 11/0069 455/450 |
| 2010/0195599 | A1* | 8/2010 | Zhang .............. H04L 5/0094 370/329 |
| 2010/0238877 | A1 | 9/2010 | Nam et al. |
| 2010/0272040 | A1 | 10/2010 | Nam et al. |
| 2010/0304682 | A1 | 12/2010 | Choi et al. |
| 2011/0034175 | A1* | 2/2011 | Fong ................ H04B 7/024 455/450 |
| 2011/0038330 | A1 | 2/2011 | Luo et al. |
| 2011/0085503 | A1 | 4/2011 | Nam et al. |
| 2011/0128872 | A1 | 6/2011 | Lindoff |
| 2011/0194485 | A1 | 8/2011 | Horneman et al. |
| 2011/0216842 | A1 | 9/2011 | Zhang et al. |
| 2011/0235608 | A1 | 9/2011 | Koo et al. |
| 2011/0237267 | A1 | 9/2011 | Chen et al. |
| 2011/0243191 | A1 | 10/2011 | Nakao et al. |
| 2011/0249767 | A1 | 10/2011 | Chen et al. |
| 2011/0305287 | A1 | 12/2011 | Kwon et al. |
| 2012/0033643 | A1 | 2/2012 | Noh et al. |
| 2012/0113951 | A1 | 5/2012 | Koo et al. |
| 2012/0120842 | A1 | 5/2012 | Kim et al. |
| 2012/0236741 | A1 | 9/2012 | Xu et al. |
| 2012/0329468 | A1 | 12/2012 | Chmiel et al. |
| 2013/0051371 | A1 | 2/2013 | Ko et al. |
| 2013/0336214 | A1 | 12/2013 | Sayana et al. |
| 2013/0343299 | A1 | 12/2013 | Sayana et al. |
| 2014/0036737 | A1 | 2/2014 | Ekpenyong et al. |
| 2014/0092829 | A1 | 4/2014 | Han et al. |

FOREIGN PATENT DOCUMENTS

| | | |
|---|---|---|
| CN | 101340228 A | 1/2009 |
| CN | 101355535 A | 1/2009 |
| EP | 2104295 A2 | 9/2009 |
| JP | 2012531082 A | 12/2012 |
| KR | 100759002 B1 | 9/2007 |
| TW | M335885 U | 7/2008 |
| TW | 200929944 A | 7/2009 |
| WO | 2009002251 A3 | 2/2009 |
| WO | 2008152612 A3 | 3/2009 |
| WO | 2009120791 A2 | 10/2009 |
| WO | 2010068011 A2 | 6/2010 |
| WO | 2010147419 A2 | 12/2010 |
| WO | 2011021154 A1 | 2/2011 |

OTHER PUBLICATIONS

3rd Generation Partnership Project; Technical Specification Group Radio Access Network; Evolved Universal Terrestrial Radio Access (E-UTRA); Physical Channels and Modulation (Release 8) 3GPP Standard; 3GPP TS 36.211, SRD Generation Partnership Project (3GPP), Mobile Competence Centre ; 650, Route Des Lucioles ; F-06921 Sophia-Antipolis Cedex ; France, No. V8.6.0, Mar. 1, 2009, pp. 1-83, XP050377538.

3rd Generation Partnership Project; Technical Specification Group Radio Access Network; Evolved Universal Terrestrial Radio Access (E-UTRA); Physical Channels and Modulation (Release 8), 3GPP TS 36.211 V8.9.0, Dec. 2009, pp. 1-83.

Ericsson: "A discussion on some technology components for LTE-Advanced", 3GPP Draft, R1-082024 {LTE—Advanced Technology Components}, 3rd Generation Partnership Project (3GPP), Mobile Competence Centre, 650 Route Des Lucioles, F-06921 Sophia-Antipolis Cedex, France, vol. RAN WG1, no. Kansas City, USA, May 14, 2008, XP050110365, [retrieved on May 14, 2008].

Ericsson, ST-Ericsson: "Draft CR 36.211 Introduction of enhanced dual layer transmission", 3GPP TSG-RAN WG1#58b R1-094321 Miyazaki, Japan, 2009.

International Search Report and Written Opinion—PCT/US2010/050987—ISA/EPO—Apr. 18, 2011.

Jungnickel .V, et al., "Implementation concepts for distributed cooperative transmission", Signals, Systems and Computers, 2008 42nd Asilomar Conference on, IEEE, Piscataway, NJ, USA, Oct. 26, 2008, pp. 1035-1039, XP031475445, ISBN: 978-1-4244-2940-0.

Li L, et al., "A Novel Semi-Dynamic Inter-Cell Interference Coordination Scheme Based on User Grouping", Vehicular Technology Conference Fall (VTC 2009—Fall), 2009 IEEE 70th, IEEE, Piscataway, NJ, USA, Sep. 20, 2009, pp. 1-5, XP031600186, ISBN: 978-1-4244-2514-3.

LTE; Evolved Universal Terrestrial Radio Access (E-UTRA); Physical channels and modulation (3GPP TS 36.211 version 8.7.0 Release 8) Technical Specification, European Telecommunications Standards Institute (ETSI), 650, Route Des Lucioles ; F-06921 Sophia-Antipolis ; France, No. V8.7.0, Jun. 1, 2009, XP014044748.

Nokia Siemens Networks et al., Considerations on Initialization and Mapping of DM-RS Sequence, 3GPP Draft, R1-093304, 3rd Generation Partnership Project (3GPP), Mobile Competence Centre , 650, Route Des Lucioles , F-06921 Sophia-Antipolis Cedex , France, no. Shenzhen, China, Aug. 19, 2009, XP050351628.

Nokia Siemens Networks et al., "Scrambling Sequence Initialisation", 3GPP Draft, R1-080940_SCRAMBLINGINIT, 3rd Generation Partnership Project (3GPP), Mobile Competence Centre, 650, Route Des Lucioles, F-06921 Sophia-Antipolis Cedex, France, vol. RAN WG1, no. Sorrento, Italy, Feb. 5, 2008, XP050109412, [retrieved on Feb. 5, 2008].

Panasonic: "Discussion on PUCCH coordination for UL CoMP", 3GPP Draft; R1-091165, 3rd Generation Partnership Project (3GPP), Mobile Competence Centre ; 650, Route Des Lucioles ; F-06921 Sophia-Antipolis Cedex ; France, no. Seoul, Korea; Mar. 17, 2009, XP050338786, [retrieved on Mar. 17, 2009].

Panasonic, "Discussion on PUCCH Coordination for UL CoMP", 3GPP TSG-RAN WG1 Meeting #56, R1-090687, Feb. 3, 2009 (3GPP TSG-RAN WG1 ftp upload date), pp. 1-2.

Philips: "Some RS Design Issues for Dual layer Beamforming", 3GPP Draft, R1-094329, 3rd Generation Partnership Project (3GPP), Mobile Competence Centre, 650, Route Des Lucioles, F-06921 Sophia-Antipolis Cedex, France, no. Miyazaki, Oct. 12, 2009.

Qualcomm Europe: "DL MU-MIMO operation in LTE-A", 3GPP Draft; R1-094215 LTE-A MU-MIMO, 3rd Generation Partnership Project (3GPP), Mobile Competence Centre ; 650, Route Des Lucioles ; F-06921 Sophia-Antipolis Cedex ; France, no. Miyazaki; Oct. 12, 2009, XP050388684, [retrieved on Oct. 6, 2009].

Qualcomm Europe: "Further Considerations and Link Simulations on Reference Signals in LTE-A", 3GPP Draft, R1-090875, 3rd Generation Partnership Project (3GPP), Mobile Competence Centre, 650, Route Des Lucioles, F-06921 Sophia-Antipolis Cedex, France, no. Athens, Greece, Feb. 4, 2009, XP050318724, [retrieved on Feb. 4, 2009].

Qualcomm Europe: "Specification details for PRS sequences", 3GPP Draft, R1-080466, 3rd Generation Partnership Project (3GPP), Mobile Competence Centre, 650, Route Des Lucioles,

(56) References Cited

OTHER PUBLICATIONS

F-06921 Sophia-Antipolis Cedex , France, vol. RAN WGI, no. Sevilla, Spain, Jan. 9, 2008, XP050108984, [retrieved on Jan. 9, 2008].

Qualcomm Europe: "UE-RS Patterns for ranks 5 to 8 of LTE-A", 3GPP Draft, R1-094212 UE RS Patterns For Rank 5-8, 3rd Generation Partnership Project (3GPP), Mobile Competence Centre, 650, Route Des Lucioles, F-06921 Sophia-Antipolis Cedex, France, no. Miyazaki, Oct. 12, 2009, XP050388682, [retrieved on Oct. 7, 2009].

Samsung: "Design Considerations for COMP Joint Transmission", 3GPP Draft, R1-091868 Design Considerations for COMP Joint Transmission, 3rd Generation Partnership Project (3GPP), Mobile Competence Centre, 650, Route Des Lucioles, F-06921 Sophia-Antipolis Cedex, France, no. San Francisco, USA, Apr. 28, 2009, XP050339364, [retrieved on Apr. 28, 2009].

Taiwan Search Report—TW099133342—TIPO—Apr. 24, 2013.

"UE-RS Patterns for Rank 3-4", 3GPP TSG-RAN WG1 #58bis, R1-094211, Oct. 12-16, 2009,pp. 8, Miyazaki, Japan.

LTE, 3rd Generation Partnership Project; Technical Specification Group Radio Access Network; Evolved Universal Terrestrial Radio Access (E-UTRA); Physical Channels and Modulation (Release 8), 3GPP TS 36.211 V8.8.0, Sep. 19, 2009, 83 Pages.

LTE, 3rd Generation Partnership Project; Technical Specification Group Radio Access Network; Further Advancements for E-UTRA Physical Layer Aspects (Release 9), R1-093680, 3GPP TR 36.814 V1.3.0, Aug. 28, 2009, 47 Pages.

Panasonic: "Comparison of Orthogonal/Non-orthogonal CoMP transmission for PUCCH", 3GPP Draft; R1-092529, 3rd Generation Partnership Project (3GPP), Mobile Competence Centre ; 650, Route Des Lucioles ; F-06921 Sophia-Antipolis Cedex ; France, no. Los Angeles, USA; Jun. 23, 2009, XP050351034, [retrieved on Jun. 23, 2009].

\* cited by examiner

SCRAMBLING SEQUENCE INITIALIZATION FOR COORDINATED MULTI-POINT TRANSMISSIONS

CROSS REFERENCES

The present application is a divisional of U.S. patent application Ser. No. 12/893,949, entitled "Scrambling Sequence Initialization for Coordinated Multi-Point Transmissions," filed Sep. 29, 2010, which claims priority to U.S. Provisional Patent Application Ser. No. 61/247,114, entitled "PDSCH Scrambling Sequence Initialization for LTE-A," filed Sep. 30, 2009, the entirety of each of which is hereby incorporated by reference.

FIELD OF INVENTION

The present invention relates generally to the field of wireless communications and, more particularly to the initialization of scrambling sequences used in physical channels in wireless communication systems.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

An orthogonal frequency division multiplex (OFDM) communication system effectively partitions the overall system bandwidth into multiple subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the frequency subcarriers. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. Generally, each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beamforming gain on the forward link when multiple antennas are available at the access point.

Coordinated multi-point (CoMP) communication that provides the possibility that two or more cells can serve the same user equipment (UE) concurrently to increase the signal to noise ration at the UE. With CoMP, two or more cells may transmit PDSCH resources to the same UE at substantially the same time, while one cell (the serving cell) manages control signaling on a physical downlink control channel (PDCCH).

SUMMARY

The disclosed embodiments relate to systems, methods, apparatus and computer program products to generate a shared initialization code for generating a common scrambling sequence for PDSCH scrambling codes in coordinated multi-point (CoMP) transmission networks in advanced wireless communication systems In one embodiment, a method includes generating a shared initialization code in a serving cell of a coordinated multi-point (CoMP) transmission network, where the shared initialization code includes a virtual serving cell identifier, initializing a scrambling sequence generator with the shared initialization code, generating a scrambling sequence from the shared initialization code and generating scrambled data with the scrambling sequence.

In one embodiment, the method includes sending the shared initialization code to another cell of the CoMP transmission network through a system controller coupled to the serving cell and the other cell of the CoMP transmission network.

In another embodiment, the method includes transmitting the shared initialization code from the serving cell to a user equipment (UE) on a physical downlink control channel (PDCCH) and transmitting the scrambled data to the UE on a first physical downlink shared data channel (PSDCH).

In one embodiment, the initialization code includes a user equipment (UE) identifier, a codeword index and a transmission slot index, where in one embodiment the UE identifier includes a virtual UE identifier, the codeword index includes one of a serving cell codeword index and a virtual codeword index, and the transmission slot index comprises one of a serving cell transmission slot index and a virtual transmission slot index. In another embodiment, the initialization code includes a codeword index, a transmission slot index and the virtual serving cell identifier.

In one embodiment, the CoMP transmission network includes a plurality of cells. In another embodiment, the CoMP transmission network includes a single cell.

In one embodiment, the method includes receiving the shared initialization code at the other CoMP cell and initializing a scrambling sequence generator in the other CoMP cell with the shared initialization code, generating the scrambling sequence with the shared initialization code, generating scrambled data with the scrambling sequence and transmitting the scrambled data to the UE on a second PDSCH.

In one embodiment, the method includes receiving the shared initialization code at the UE, initializing a scrambling sequence generator in the UE with the shared initialization code, generating the scrambling sequence with the shared initialization code, receiving scrambled data on at least one of the first PDSCH and the second PDSCH and descrambling the scrambled data with the scrambling sequence.

In one embodiment, another method includes generating a shared initialization code in a serving cell of a coordinated multi-point (CoMP) transmission network where the shared initialization code includes a serving cell identifier, sending the initialization code to another cell in the CoMP transmission network through a system controller coupled to the serving cell and the other cell of the CoMP transmission network and transmitting the shared initialization code from the serving cell to a user equipment (UE) on a physical downlink control channel (PDCCH).

In one embodiment, the method also includes initializing a scrambling sequence generator with the shared initialization code, generating a scrambling sequence from the shared initialization code, generating scrambled data with the scrambling sequence and transmitting the scrambled data to a user equipment (UE) on a first physical downlink shared channel (PDSCH).

In one embodiment, the method includes receiving the shared initialization code at the other CoMP cell, initializing a scrambling sequence generator in the other CoMP cell with the shared initialization code, generating the scrambling sequence with the shared initialization code, generating scrambled data with the scrambling sequence and transmitting the scrambled data to the UE on a second PDSCH.

In one embodiment, the serving cell identifier includes a virtual serving cell identifier, a UE identifier, a codeword index and a transmission slot index, where in one aspect the UE identifier includes a virtual UE identifier.

In one embodiment, the codeword index includes one of a serving cell codeword index and a virtual codeword index and the transmission slot index includes one of a serving cell slot index and a virtual transmission slot index.

In one embodiment, the initialization code consists of the serving cell identifier, the codeword index and the transmission slot index.

In one embodiment, the method includes receiving the shared initialization code at the UE, initializing a scrambling sequence generator in the UE with the shared initialization code, generating the scrambling sequence with the shared initialization code, receiving scrambled data on at least one of the first PDSCH and the second PDSCH, and descrambling the scrambled data with the scrambling sequence.

In one embodiment, a method includes receiving components of a shared initialization code from a CoMP serving cell at a user equipment, where the components of the shared initialization code are configured to generate an uplink scrambling sequence for a CoMP transmission network, generating the shared initialization code to initialize a scrambling sequence generator for a physical uplink shared channel, transmitting the shared initialization code to a cell in the CoMP transmission network on a physical uplink control channel, wherein the cell in the CoMP transmission network is configured to descramble data on a physical uplink shared channel from the UE with a scrambling sequence generated from the shared initialization code, and transmitting the scrambled data to the cell in the CoMP transmission network on a physical uplink shared channel.

In one embodiment, another method includes receiving at a user equipment (UE), a shared initialization code from a CoMP serving cell, the shared initialization code configured to generate a common scrambling sequence for a coordinated multi-point (CoMP) transmission network, and transmitting the shared initialization code to another cell in the CoMP transmission network.

In one embodiment, the other cell in the CoMP transmission network is configured to scramble data with a scrambling sequence generated with the shared initialization code, and to transmit the scrambled data to the UE.

In one embodiment, the method includes receiving scrambled data at the UE from at least one of the CoMP serving cell on a first PDSCH and the other cell in the CoMP transmission network on a second PDSCH.

In one embodiment, the initialization code comprises a codeword index, a transmission slot index and a cell identifier. In one embodiment, the initialization code further comprises a UE identifier. In one embodiment, the UE identifier includes a virtual UE identifier.

In one embodiment, the codeword index includes one of a serving cell codeword index and a virtual codeword index, the transmission slot index includes one of a serving cell transmission slot index and a virtual transmission slot index, and the cell identifier includes one of a serving cell identifier and a virtual cell identifier.

In one embodiment, a serving cell in a CoMP transmission network includes a processor and a memory, where the memory includes processor executable instructions that, when executed by the processor, configure the serving cell to generate a shared initialization code for the CoMP transmission network, where the shared initialization code includes a virtual serving cell identifier, to initialize a scrambling sequence generator with the shared initialization code, to generate a scrambling sequence from the shared initialization code, and to generate scrambled data with the scrambling sequence.

In one embodiment, the memory includes additional processor executable instructions that, when executed by the processor, configure the serving cell to send the shared initialization code to an other cell of the CoMP transmission network through a system controller coupled to the serving cell and the other cell of the CoMP transmission network In one embodiment, the memory also includes processor executable instructions that, when executed by the processor, configure the serving cell to transmit the shared initialization code from the serving cell to a user equipment (UE) on a physical downlink control channel (PDCCH).

In one embodiment, the memory includes processor executable instructions that, when executed by the processor, configure the serving cell to transmit the scrambled data to the UE on a first physical downlink shared data channel (PSDCH).

In one embodiment, the initialization code includes a user equipment (UE) identifier, a codeword index and a transmission slot index. In one embodiment, the UE identifier includes a virtual UE identifier, the codeword index includes one of a serving cell codeword index and a virtual codeword index, and the transmission slot index includes one of a serving cell transmission slot index and a virtual transmission slot index.

In one embodiment, the initialization code comprises a codeword index, a transmission slot index and the virtual serving cell identifier.

In one embodiment, a serving cell in a CoMP transmission network includes a processor and a memory including processor executable instructions that, when executed by the processor, configure the serving cell to generate a shared initialization code for the CoMP transmission network, where the shared initialization code includes a serving cell identifier, to send the initialization code to another cell in the CoMP transmission network through a system controller coupled to the serving cell and the other cell of the CoMP transmission network, and to transmit the shared initialization code to a user equipment (UE) on a physical downlink control channel (PDCCH). In one embodiment, the serving cell identifier includes a virtual serving cell identifier.

In one embodiment, the memory further includes processor executable instructions that, when executed by the processor, configure the serving cell to initialize a scrambling sequence generator with the shared initialization code, to generate a scrambling sequence from the shared initialization code, to generate scrambled data with the scrambling sequence, and to transmit the scrambled data to a user equipment (UE) on a physical downlink shared channel (PDSCH).

In one embodiment, the initialization code includes a UE identifier, a codeword index, a transmission slot index. In one embodiment, the UE identifier includes a virtual UE identifier. In one embodiment, the codeword index includes one of a serving cell codeword index and a virtual codeword index and the transmission slot index includes one of a serving cell slot index and a virtual transmission slot index. In one embodiment, the initialization code comprises the serving cell identifier, the codeword index and the transmission slot index.

In one embodiment, a communication device includes a processor and a memory comprising processor executable instructions that, when executed by the processor, configure the communication device to receive a shared initialization code from a CoMP serving cell, the shared initialization code configured to generate a common scrambling sequence for a coordinated multi-point (CoMP) transmission network, and to transmit the shared initialization code to another cell in the CoMP transmission network. In one embodiment, the other cell in the CoMP transmission network is configured to scramble data with a scrambling sequence generated with the shared initialization code.

In one embodiment, the memory further includes processor executable instructions that, when executed by the processor, configure the communication device to receive scrambled data from at least one of the CoMP serving cell on a first PDSCH and the other cell in the CoMP transmission network on a second PDSCH.

In one embodiment, the initialization code comprises a codeword index, a transmission slot index and a cell identifier. In one embodiment, the initialization code further comprises a UE identifier. In one embodiment, the codeword index includes one of a serving cell codeword index and a virtual codeword index, the transmission slot index includes one of a serving cell transmission slot index and a virtual transmission slot index, and the cell identifier includes one of a serving cell identifier and a virtual cell identifier. In one embodiment, the UE identifier includes a virtual UE identifier.

These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Provided embodiments are illustrated by way of example, and not of limitation, in the figures of the accompanying drawings in which.

DETAILED DESCRIPTION

Figure 1:
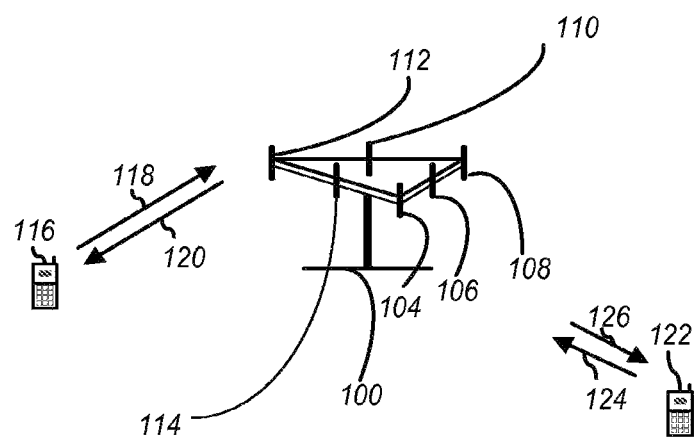
FIG. 1 illustrates a wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Further, the following terminology and features may be used in describing the various disclosed embodiments:

3G 3rd Generation
3GPP 3rd Generation Partnership Project
ACLR Adjacent channel leakage ratio
ACPR Adjacent channel power ratio
ACS Adjacent channel selectivity
ADS Advanced Design System
AMC Adaptive modulation and coding
A-MPR Additional maximum power reduction
ARQ Automatic repeat request
BCCH Broadcast control channel
BTS Base transceiver station
CDD Cyclic delay diversity
CCDF Complementary cumulative distribution function
CDMA Code division multiple access
CFI Control format indicator
Co-MIMO Cooperative MIMO
CP Cyclic prefix
CPICH Common pilot channel
CPRI Common public radio interface
CQI Channel quality indicator
CRC Cyclic redundancy check
DCI Downlink control indicator
DFT Discrete Fourier transform
DFT-SOFDM Discrete Fourier transform spread OFDM
DL Downlink (base station to subscriber transmission)
DL-SCH Downlink shared channel
DSP Digital signal processing
DT Development toolset
DVSA Digital vector signal analysis
EDA Electronic design automation
E-DCH Enhanced dedicated channel
E-UTRAN Evolved UMTS terrestrial radio access network
eMBMS Evolved multimedia broadcast multicast service
eNB Evolved Node B
EPC Evolved packet core
EPRE Energy per resource element
ETSI European Telecommunications Standards Institute
E-UTRA Evolved UTRA
E-UTRAN Evolved UTRAN
EVM Error vector magnitude
FDD Frequency division duplex
FFT Fast Fourier transform
FRC Fixed reference channel
FS1 Frame structure type 1
FS2 Frame structure type 2
GSM Global system for mobile communication
HARQ Hybrid automatic repeat request
HDL Hardware description language
HI HARQ indicator
HSDPA High speed downlink packet access
HSPA High speed packet access
HSUPA High speed uplink packet access
IFFT Inverse FFT
IOT Interoperability test
IP Internet protocol
LO Local oscillator
LTE Long term evolution
MAC Medium access control
MBMS Multimedia broadcast multicast service
MBSFN Multicast/broadcast over single-frequency network
MCH Multicast channel
MIMO Multiple input multiple output
MISO Multiple input single output
MME Mobility management entity
MOP Maximum output power
MPR Maximum power reduction
MU-MIMO Multiple user MIMO NAS Non-access stratum
OBSAI Open base station architecture interface
OFDM Orthogonal frequency division multiplexing
OFDMA Orthogonal frequency division multiple access
PAPR Peak-to-average power ratio
PAR Peak-to-average ratio
PBCH Physical broadcast channel
P-CCPCH Primary common control physical channel
PCFICH Physical control format indicator channel
PCH Paging channel
PDCCH Physical downlink control channel
PDCP Packet data convergence protocol
PDSCH Physical downlink shared channel
PHICH Physical hybrid ARQ indicator channel
PHY Physical layer
PRACH Physical random access channel
PMCH Physical multicast channel
PMI Pre-coding matrix indicator
P-SCH Primary synchronization signal
PUCCH Physical uplink control channel
PUSCH Physical uplink shared channel.

Figure 2:
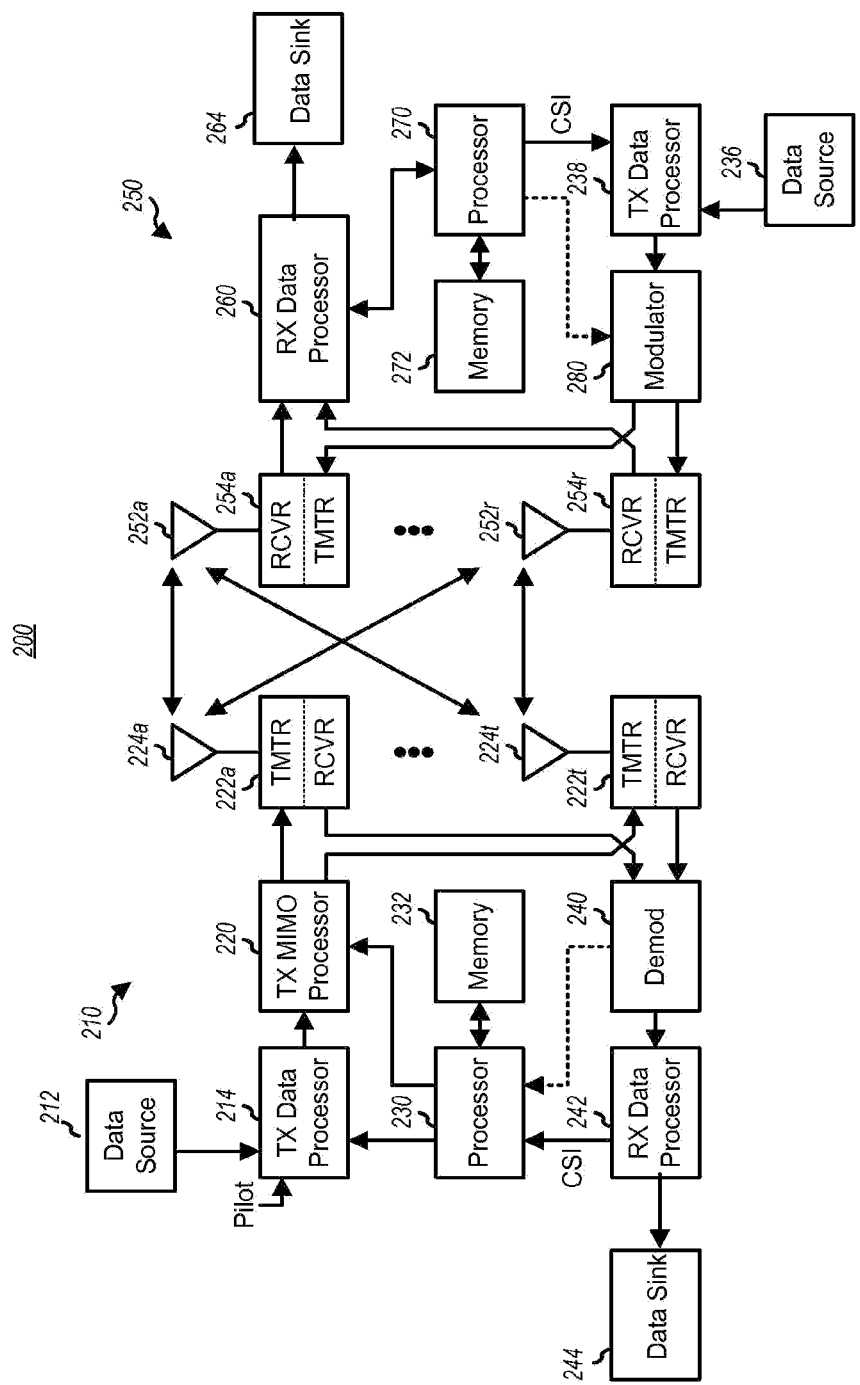
FIG. 2 illustrates a block diagram of a communication system.

FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which precoding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems each of the signals transmitted from the transmitter system antennas 224a through 224t will experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

In LTE Rel-8, the role of the physical downlink layer is primarily to translate data into a reliable signal for transmission across the radio interface between the eNodeB and the User Equipment (UE). Each block of data is first protected against transmission errors with channel coding. In LTE Rel-8, a codeword is an independently coded data block, corresponding to a single transport block (TB) delivered from the Medium Access Control (MAC) layer to the physical layer and protected by a CRC.

There can be one or two codewords depending on the rank of the transmission, where the rank is equal to the number of spatial layers. A spatial layer is the term used in LTE for the different streams generated by spatial multiplexing, and can be described as a mapping of symbols onto the transmit antenna ports. For ranks greater than 1, two codewords can be transmitted. The number of codewords is always less than or equal to the number of layers, which in turn is always less than or equal to the number of antenna ports.

Figure 3:
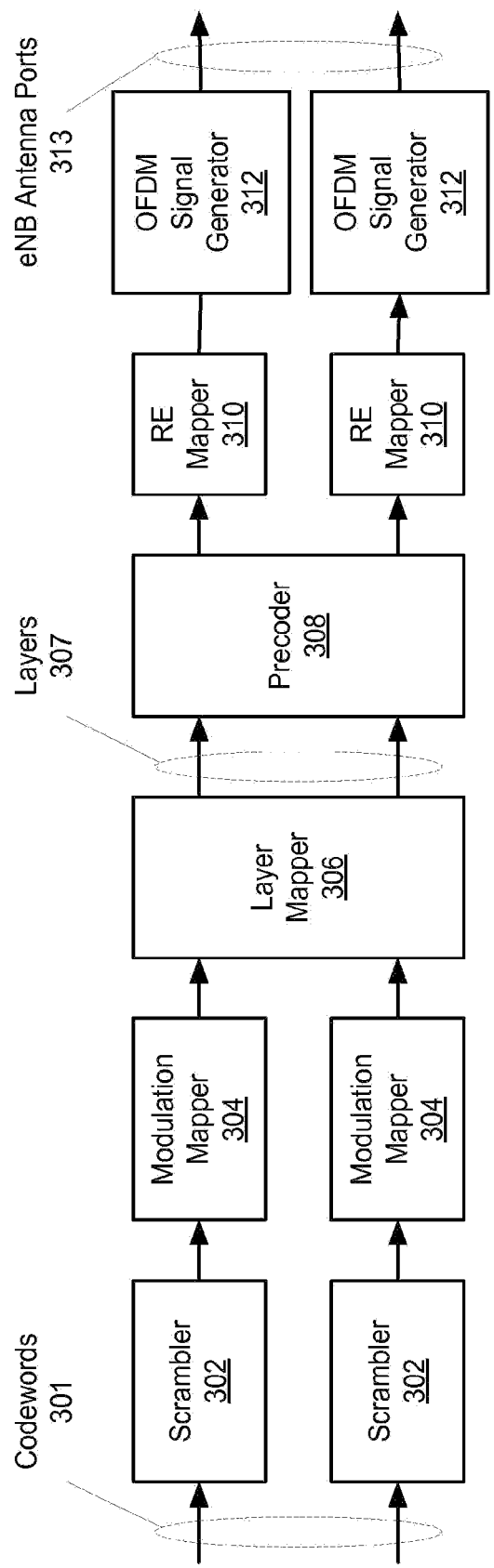
FIG. 3 illustrates a scrambling sequence generator in one embodiment.

After channel coding, the formation of the downlink LTE signal are illustrated in FIG. 3. The codewords 301 are scrambled in scrambling stages 302. Following the scrambling stages 302, the data bits from each channel are mapped to complex valued modulation symbols in modulation mappers 304, then mapped to layers in layer mappers 306. Each layer 307 is precoded in a precoder 308, where it is identified by a precoding vector of size equal to the number of transmit antenna ports. The data in each layer is then mapped to resource elements (REs) in RE mapper 310. A resource element is the smallest unit of resource in LTE, and comprises one OFDM subcarrier for a duration of one OFDM symbol. Finally, the REs are translated into a complex-valued OFDM signal by means of an IFFT in OFDM signal generators 312, and output to antenna ports 313.

Scrambling is applied to all downlink physical channels, and serves the purpose of interference rejection. The scrambling sequence in all cases uses an order 31 Gold code, which can provide $2^{31}$ sequences that are not cyclic shifts of each other. Gold codes also possess the attractive feature that they can be generated with very low implementation complexity, as they can be derived from the modulo-2 addition of two maximum-length sequences (known as M-sequences), which can be generated from a simple shift register. An exemplary shift-register implementation of the LTE Rel-8 scrambling sequence generator is illustrated in FIG. 4.

Figure 4:
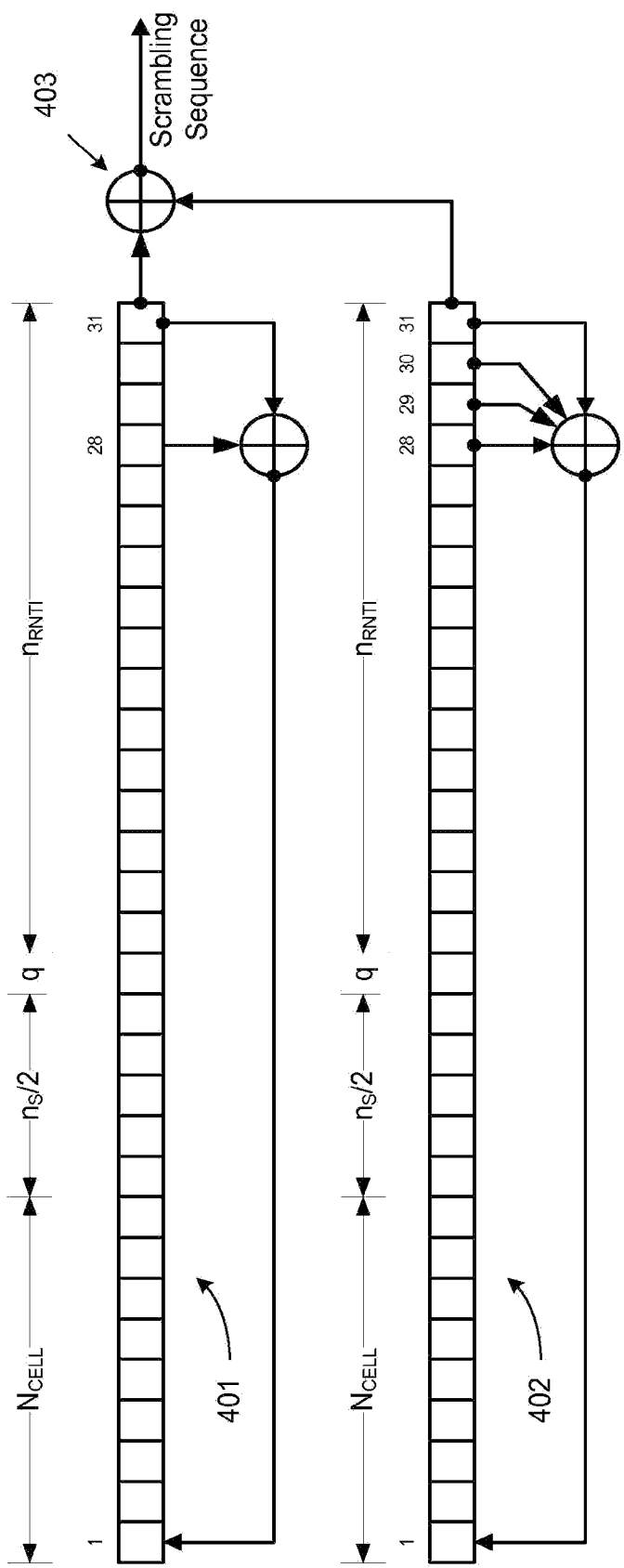
FIG. 4 illustrates a wireless communication system configured for coordinated multipoint transmission/reception in one embodiment.

As illustrated in FIG. 4, the scrambling sequence generator 400 includes two 31-bit maximal length linear feedback shift registers 401 and 402, with characteristic polynomials of $(x^{31}+x^{28}+1)$ and $(x^{31}+x^{30}+x^{29}+x^{28}+1)$, respectively, whose outputs are added modulo-2 in adder 403.

For LTE Rel-8, PDSCH transmissions, the scrambling sequence generator (e.g., generator 400) is initialized at the start of each subframe with a block of coded bits $c_{init}$ based on the identity of the cell (9 bits), the transmission slot index (5 bits), a codeword index (1 bit) and the UE identifier (16 bits), according to:

$$c_{init}=n_{RNTI}\cdot 2^{14}+q\cdot 2^{13}+\lfloor n_s/2\rfloor\cdot 2^9+N_{ID}^{cell} \quad (1)$$

where $n_{RNTI}$ corresponds to the Radio Network Temporary Identifier (RNTI) associated with the PDSCH transmission, q is the codeword index (0 or 1), $n_s$ is the slot index (0 to 19), and $N_{ID}^{cell}$ is the ID of the given cell. This is illustrated in FIG. 4. Additionally, after each initialization, a fast forward of 1600 places is applied in order to ensure low cross-correlation between sequences used in adjacent cells.

A similar process occurs in the case of the physical uplink shared channel (PUSCH) transmissions, where a scrambling sequence generator in the UE is initialized. However, in the case of the uplink, the scrambling initialization code is given by:

$$c_{init}=n_{RNTI}\cdot 2^{14}+\lfloor n_s/2\rfloor\cdot 2^9+N_{ID}^{cell} \quad (2)$$

where $n_{RNTI}$ and $N_{ID}^{cell}$ are as defined above, and $n_s$ is the transmission slot index of the uplink transmission frame.

The structure of the initialization code for the uplink differs from the downlink in that there is no codeword index, q, associated with the uplink initialization code.

While this approach randomizes interference between cells and between UEs, it would also result in additional operations and overhead in the management of coordinated multi-point transmission. Downlink coordinated multi-point (DL-CoMP) transmission makes it possible to have two or more cells serving the same UE concurrently. That is, two or more cells may transmit PDSCH to the same UE at about the same time. In some aspects, the control signaling (PDSCH) is only transmitted from one cell (denoted as the serving cell). It is thus desirable to have identical PDSCH scrambling sequences for all the cells involved in DL-CoMP. This is particularly relevant for dynamic switching between single point and multi point (CoMP) transmissions-UE transparent single-point/multi-point transmission. For transparent operation, the scrambling of reference signals (RS) and data from different cells participating in the joint transmission to a given UE should be the same. However, it will be recognized that the initialization code given in equation (1) is cell-specific, where its current form will result in different PDSCH scrambling sequences for different cells. Note also that a UE specific ID ($n_{RNTI}$) is implicated in the aforementioned PDSCH scrambling sequence initialization.

Figure 5:
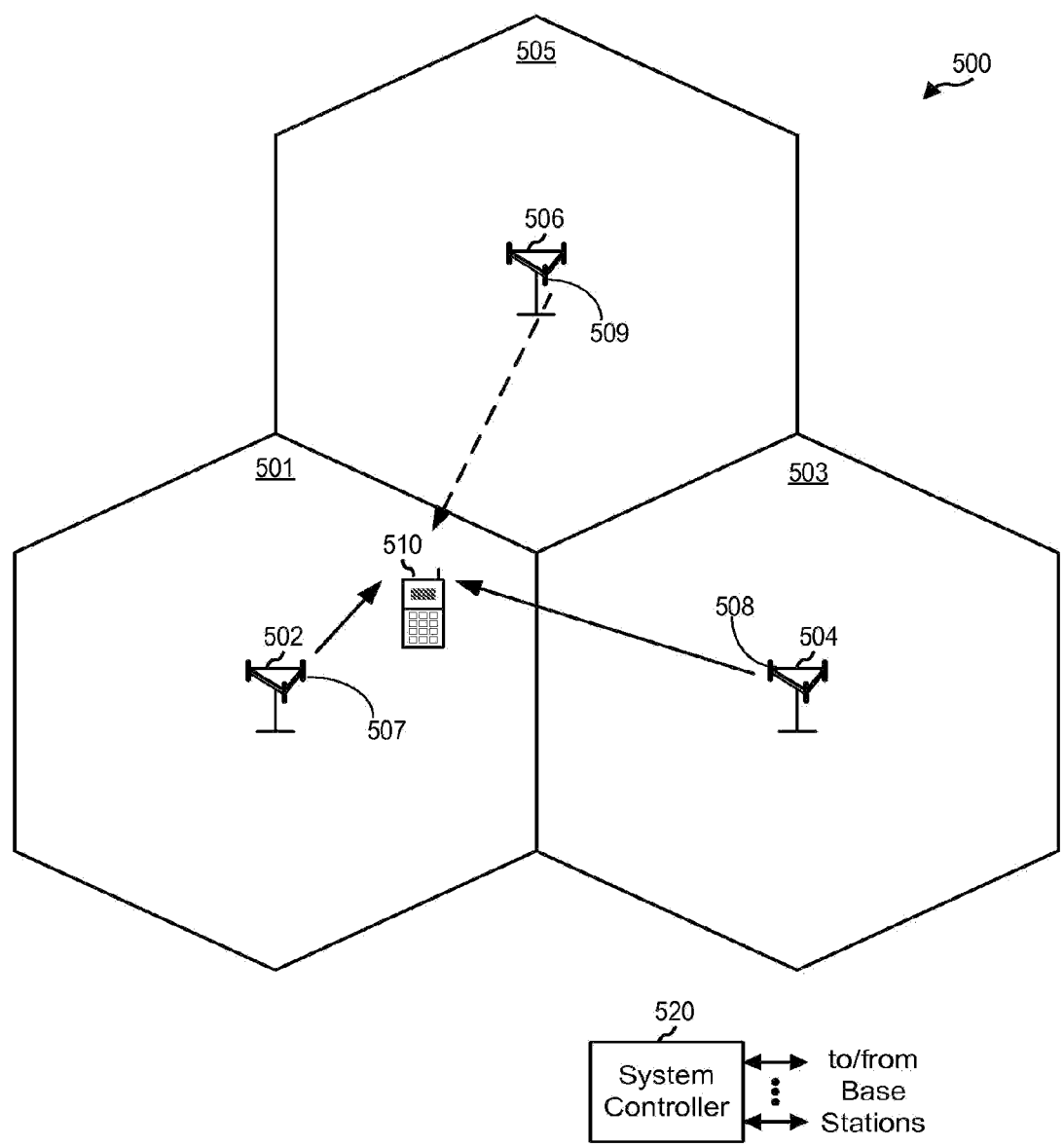
FIG. 5 is a block diagram illustrating a system configured to employ shared initialization codes for scrambling in one embodiment.

FIG. 5 illustrates a cluster of cells (501, 503, 505) in a wireless network having respective base stations 502, 504 and 506. To maintain communication, for example, with base stations 502 in sector 507 and base station 504 in sector 508 in a DL-CoMP mode, a UE 510 may generate two different scrambling sequences based on two different initialization codes. One scrambling sequence will be generated from an initialization code based on the cell ID of base station 502, the RNTI of UE 510, the codeword index for base station 502 and the transmission slot index of base station 502. The other scrambling sequence will be generated from an initialization code based on the cell ID of base station 504, the RNTI of the UE 510, the codeword index for base station 504 and the transmission slot index of base station 504. Additionally, if the UE 510 is mobile and moves into range of base station 506 in cell 505, UE 510 may need to generate a third scrambling sequence based on parameters associated with base station 506 during the transition. All of this complexity creates a significant amount of control channel signaling overhead.

Such additional complexity may be avoided for DL-CoMP in accordance with aspects of the present disclosure. To address the issue of cell-specific scrambling, a method in one embodiment is to provide for all the cells involved in the DL-CoMP operation to use the cell ID of a pre-designated serving cell. That is, $$c_{init}=n_{RNTI}\cdot 2^{14}+q\cdot 2^{13}+\lfloor n_s/2\rfloor\cdot 2^9+N_{ID}^{ServingCell}$$

where $N_{ID}^{ServingCell}$ is the ID of the designated serving cell, regardless of whether the given cell is the actual serving cell or not. Another possibility is to assign a virtual ID associated with a cluster of cells such as cells 501, 505 and 505. Such a virtual ID may be semi-statically configured and indicated to the UE. In this case, the initialization code given by:

$$c_{init}=n_{RNTI}\cdot 2^{14}+q\cdot 2^{13}+\lfloor n_s/2\rfloor\cdot 2^9+N_{ID}^{Virtual}$$

Note that the cluster ID or the virtual ID may or may not be linked to cell IDs serving the UE.

It may be desirable to omit the UE ID from the initialization code used for the scrambling operation for the sake of reducing complexity in the cells involved in the DL-CoMP operation. In this case, then, the initialization code simplifies to:

$$c_{init}=q \cdot 2^{13}+\lfloor n_s/2 \rfloor \cdot 2^9+N_{ID}$$

where $N_{ID}$ is a serving cell ID or virtual ID representing the cluster. In this case, the bits in the scrambling sequence generator can be padded with zeros to maintain compatibility with LTE Rel-8 requirements. Alternatively, a virtual UE ID $n_{virtual}$ can be used, just like the virtual cell ID described above, such that the initialization code is defined as:

$$c_{init}=n_{virtual} \cdot 2^{14}+q \cdot 2^{13}+\lfloor n_s/2 \rfloor \cdot 2^9+N_{ID}$$

It is expected that for cells involved in the CoMP operation, these cells should be aligned at least on the subframe boundaries. However, it is possible that different cells may have different subframe indices. For instance, cell 501 may be aligned on subframes 0, 1, 2, 3, etc., while cell 503 is aligned on subframes 1, 2, 3, 4, etc. That is, the two cells are subframe boundary aligned but not necessarily subframe index aligned (i.e., not completely synchronized, or non-radio-frame aligned). In this case, the $n_s$ value used in the above scrambling should be the same for all the cells involved and could be based on the subframe index of the serving cell, or based on a virtual subframe/slot indices, where all cells involved exchange and share common values.

Similarly, the transmission slot index may be replaced with the slot index of the serving cell or a virtual slot index assigned to the cluster, for example. The same approach may be applied to the codeword index, assigning the serving cell's codeword index or a virtual codeword. It should be noted that these changes to the parameters for the scrambling sequence initialization code will not affect the normal operation of other UEs in the cluster. It should also be noted that using virtual parameters in the initialization code will not affect the randomness of the CoMP scrambling sequence with respect to other UEs in the CoMP cells.

As noted above, the initialization code used in the UE for the physical uplink shared channel (PUSCH) has the same structure as the initialization code for the PDCCH except for the absence of a codeword index (which is not relevant to the uplink). Accordingly, all of the configurations discussed for the downlink scrambling initialization code may be applied to the uplink, with the exception of the codeword options. That is, in accordance with the present disclosure, the uplink scrambling initialization code may use a serving cell identifier or a virtual serving cell identifier, a UE identifier or a virtual UE identifier, a UE transmission slot index or a virtual UE transmission slot index. Similarly, the uplink scrambling initialization code may omit the UE identifier.

A similar approach may be used to generate the scrambling sequence for scrambling the UE reference signals (UE-RS) for all the cells involved in the CoMP transmission One approach for initializing the UE-RS sequence is given by $$c_{init}=(\lfloor n_s/2 \rfloor+1) \cdot (2N_{ID}^{cell}+1) \cdot 2^{16}$$

where all the parameters are defined above. In order to generate the same UE-RS random sequence for all the cells involved, the same design principle discussed above is applicable as well, in particular, $c_{init}$ may be defined as:

$$c_{init}=(\lfloor n_s/2 \rfloor+1) \cdot (2N_{ID}+1) \cdot 2^{16}$$

where $N_{ID}$ is a designated serving cell ID or a virtual cell ID.

Communicating these common initialization parameter values, virtual or otherwise, between CoMP cells, may be accomplished through a backhaul controller such as system controller 520 in FIG. 5, and descried in greater detail below.

With respect to the uplink, the UE may receive the relevant parameters (i.e., serving cell identifier and UE identifier) and may then transmit the uplink initialization code parameters (serving cell identifier, UE identifier and UE transmission slot index) to other cells participating in the UL-CoMP (i.e., point-to-multipoint) transmission network via the physical uplink control channel (PUCCH) to enable scrambled transmissions on the physical uplink shared channel (PUSCH).

Figure 8:
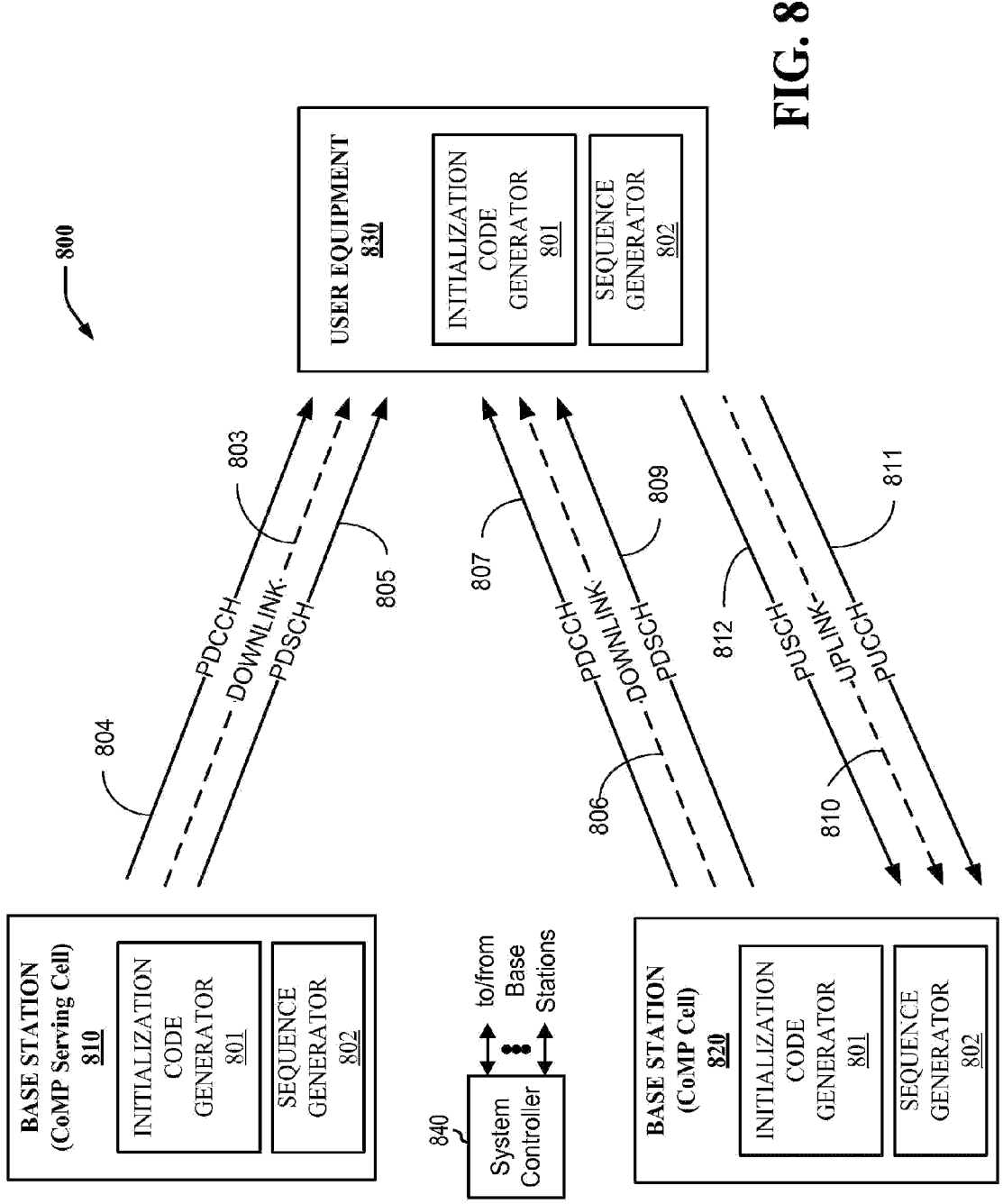
FIG. 8 illustrates a system in one embodiment.

FIG. 8 illustrates a system 800 according to one exemplary embodiment. In FIG. 8, a base station 810 is designated as a CoMP serving cell, base station 820 is a CoMP cell in a CoMP transmission network, and user equipment (UE) 830 is the UE to be configured for DL-CoMP. System 800 employs an initialization code generator 801 and a scrambling sequence generator 802 in each of the base stations and UE's involved in the DL-CoMP transmissions. Base station 810 communicates with UE 830 via downlink 803, which supports physical downlink control channel PDCCH 804 and physical downlink shared channel 805. Base station 820 communicates with UE 830 via downlink 806, which supports PDCCH 807 and PDSCH 809. In turn, UE 830 communicates with base station 820 via uplink 810, which supports physical uplink control channel (PUCCH) 811 and physical uplink shared channel (PUSCH) 812. Communication between base station 810 and base station 820 is managed by system controller 840. While FIG. 8 illustrates only two base stations and one UE, it will be appreciated that provided embodiments are not so limited, and may include more than two base stations and more than one UE.

In general, system 800 generates a shared initialization code for scrambling sequence generation in each base station and UE (jointly, the CoMP participants) involved in a CoMP transmission network, and each CoMP participant includes a scrambling sequence generator 802, which may be implemented in hardware, software, firmware or some combination thereof, such as is known in the art, and an initialization code generator, 801, which may be implemented in hardware, software, firmware or some combination thereof, such as is known in the art.

In general, the system 800 generates identical, shared scrambling initialization codes for PDSCHs between CoMP base stations and UEs, such that identical (i.e., common) sequences are generated by all cells involved in a downlink (DL) coordinated multi-point transmissions/receptions (CoMP) operation in order to optimize switchover operations between single-point and multi-point CoMP transmissions. Similarly, system 800 generates identical, shared scrambling initialization codes for PUSCH transmissions between a UE configured for CoMP operation and CoMP base stations, such that the scrambling sequences used for scrambling data transmissions on the PUSCH are the same as the scrambling sequences used in the CoMP base stations to descramble the data transmissions on the PUSCH.

In one aspect, all cells involved in DL-CoMP can employ the same serving cell identifier (ID) whether a given cell is the serving cell or not. The cell ID can be passed between cells as a parameter where each of the cells then employs the same cell ID during initialization. In another aspect, a virtual ID is generated and employed by each of the cells involved in the DL-CoMP operation or communication. Again, by requiring all cells in addition to the serving cell to utilize the same cell ID, switchover between single-point and multi-point CoMP transmissions can be facilitated.

In the system 800 of FIG. 8, base station 810 (CoMP serving cell) is configured to generate a shared initialization code with initialization code generator 801 based on a real or virtual cell identifier, a real or virtual codeword index, a real or virtual transmission slot index, and optionally, a real or virtual identifier of UE 830. Base station 810 is configured to transmit the shared initialization code to UE 830 on downlink 803 using PDCCH 804.

Base station 810 is also configured to send the shared initialization code parameters to base station 820 (CoMP cell) via system controller 840. Base station 820 is configured to generate the shared initialization code locally, to initialize a local scrambling sequence generator 802, and to scramble data to be sent to UE 830 on downlink 806 via PDCCH 807.

UE 830 is configured to receive the shared initialization code or code parameters on PDCCH 804, and generate the shared initialization code locally in generator 801, to initialize its local sequence generator 802, and to generate a descrambling sequence based on the initialization code. UE 830 is further configured receive scrambled data from base station 810 on PDSCH 803 and from base station 820 on PDSCH 809, and to descramble the scrambled data using the descrambling code.

In other embodiment, base station 810 does not send the initialization code to base station 820. Instead, after receiving the initialization code from base station 810 on PDCCH 804, the UE 830 transmits the initialization code to base station 820 on uplink 810 via physical uplink control channel 811. After receiving the initialization code from UE 830, base station 820 processes the code, scrambles data and transmits date to UE 830 as described above.

In another embodiment, UE 830 receives, from base station 810, a serving cell identifier or virtual serving cell identifier, and a UE identifier or virtual UE identifier. UE 830 may then generate an UL-CoMP initialization code for PUSCH CoMP transmissions, using the serving cell identifier (actual or virtual), the UE identifier (actual or virtual) and a PUSCH transmission slot index associated with the UE (actual or virtual), and transmit the initialization code, or the parameters thereof, to base station 820 on PUCCH 811 (and to base station 810 on another PUCCH, not shown). UE 830 may then transmit scrambled UL-CoMP data to base stations 810 and 820 on the respective PUSCHs and base stations 810 and 820 may descramble the scrambled PUSCH data using descrambling sequences generated from the UL-CoMP scrambling initialization code received from UE 830.

Figure 6:
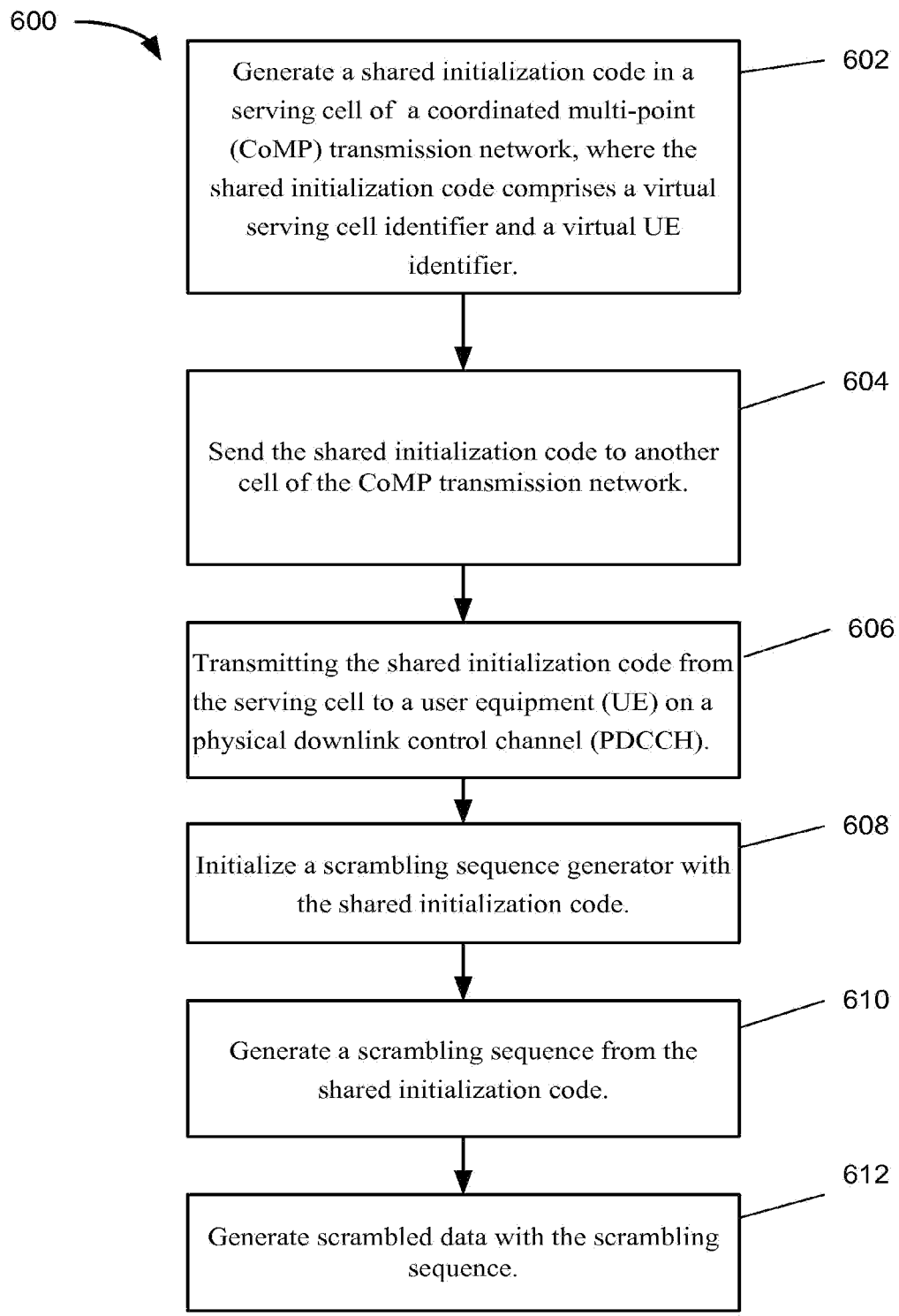
FIG. 6 is a flowchart illustrating a method in an evolved node base station (eNodeB) in one embodiment.

FIG. 6 is a flowchart illustrating a method 600 according to one provided embodiment. For purposes of simplicity of explanation, the method is shown and described as a series of operations. It is to be understood that the method is not limited by the order of operations, as some operations can, in accordance with one or more embodiments, occur in different orders and/or concurrently with other operations from that shown and described herein. For example, those skilled in the art will understand and appreciate that a method could alternatively be represented as a series of interrelated states or events, such as in a state diagram. Moreover, not all illustrated operations may be required to implement a method in accordance with one or more of the disclosed embodiment.

In FIG. 6, and with reference to exemplary system 800, the method begins at operation 602, where a shared initialization code is generated in a serving cell 810 of a CoMP transmission network, where the shared initialization code includes at least a virtual serving cell ID and a virtual UE identifier. In operation 604, the shared initialization code sent to another cell 820 of the CoMP transmission network. The other cell 820 may be coupled to the serving cell 810 through a system controller 840. In operation 606, the shared initialization code is transmitted from the serving cell 810 to a UE 830 on a physical downlink control channel (PDCCH) 804. The scrambling sequence generator 802 in the serving cell 810 is initialized with the initialization code in operation 608. A scrambling sequence is generated by sequence generator 802 in the serving cell 810 in operation 610, and scrambled data is generated with the scrambling sequence in operation 612. As described above the initialization code may include the serving cell ID or a virtual serving cell ID, a UE ID, virtual UE ID or no UE ID, a codeword index or a virtual codeword index, and a transmission slot index or a virtual transmission slot index.

Figure 7A:
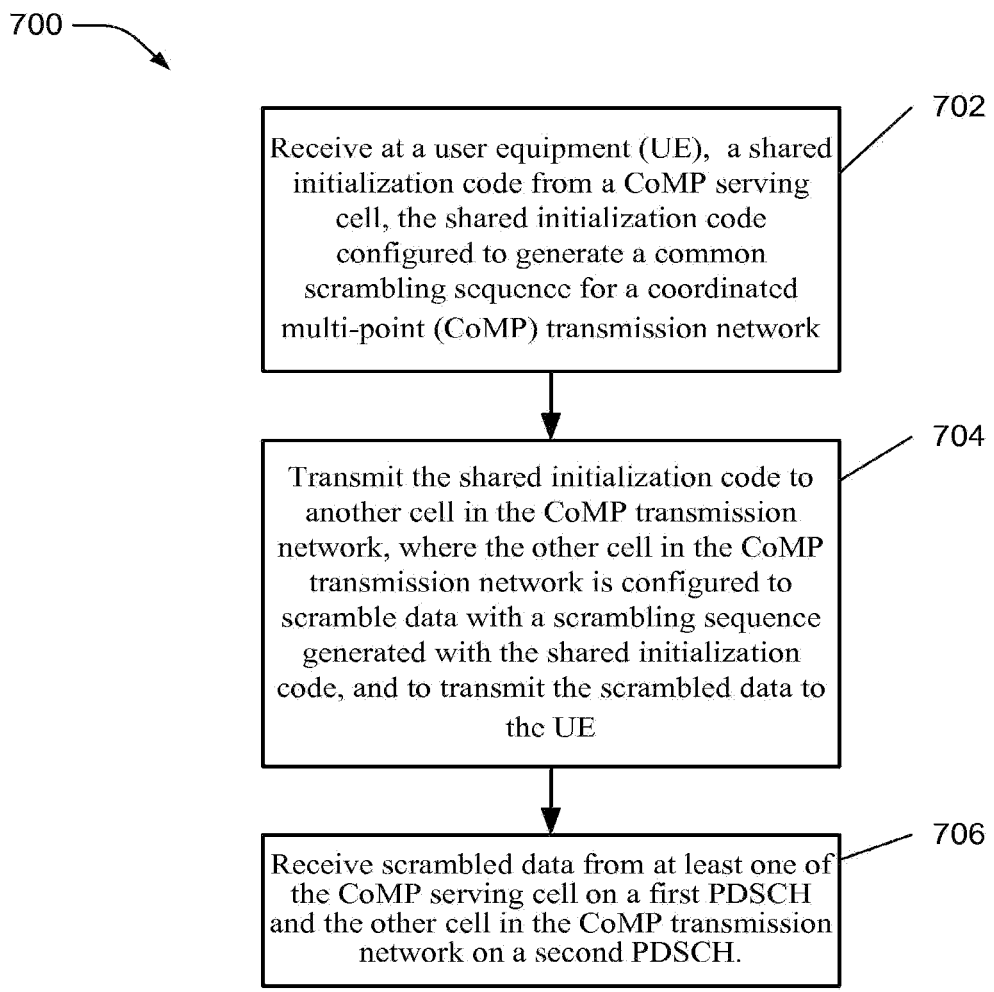
FIG. 7A is a flowchart illustrating a method in a user equipment in one embodiment.

FIG. 7A is flowchart illustrating a method 700 according to one provided embodiment. In FIG. 7A, and with reference to exemplary system 800, the method 700 begins at operation 702, where a UE 830 receives a shared initialization code from a CoMP serving cell 810, where the shared initialization code is configured to generate a common scrambling sequence for a coordinated multi-point (CoMP) transmission network. At operation 704, the UE 830 transmits the shared initialization code to another cell 820 in the CoMP transmission network, where the other cell in the CoMP transmission network scrambles data with a scrambling sequence generated with the shared initialization code, and transmits the scrambled data to the UE. In operation 706, the UE 830 receives scrambled data from at least one of the CoMP serving cell 810 on a first PDSCH 805 and from another cell 820 in the CoMP transmission network on a second PDSCH 809.

Figure 7B:
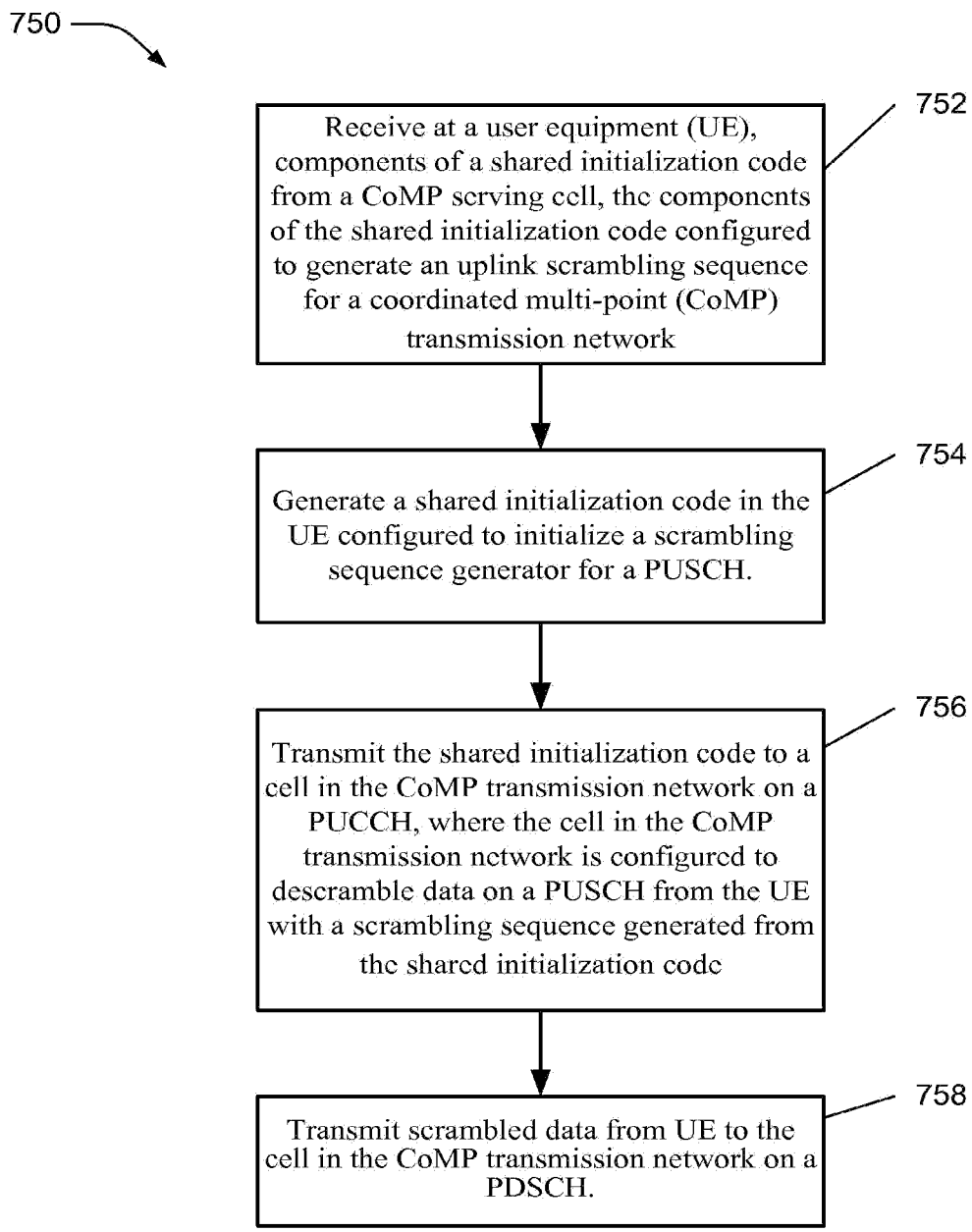
FIG. 7B is a flowchart illustrating another method in a user equipment in one embodiment.

FIG. 7B is a flowchart illustrating a method 750 according to one provided embodiment. In FIG. 7B, and with reference to exemplary system 800, the method 750 begins at operation 752, where a UE 830 receives components of a shared initialization code from a CoMP serving cell 810, where the components of the shared initialization code are configured to generate an uplink scrambling sequence for a CoMP transmission network. At operation 754, the UE 830 generates the shared initialization code to initialize a scrambling sequence generator for a physical uplink shared channel (PUSCH). In operation 756, the UE 830 transmits the shared initialization code to a cell (e.g., 810 or 820) in the CoMP transmission network on a physical uplink control channel (PUCCH), where the cell in the CoMP transmission network is configured to descramble data on a PUSCH from the UE with a scrambling sequence generated from the shared initialization code. In operation 758, the UE transmits scrambled data to the cell(s) in the CoMP transmission network on a PUSCH.

Figure 9:
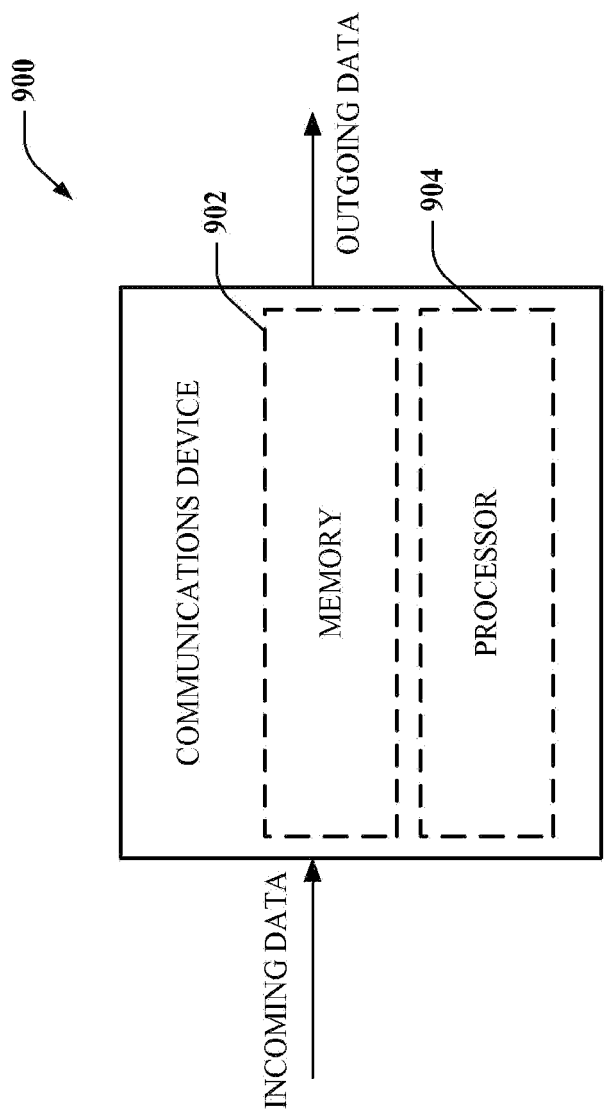
FIG. 9 illustrates an exemplary apparatus for processing data in a wireless communication system.

FIG. 9 illustrates an apparatus 900 within which various disclosed embodiments may be implemented. In particular, the apparatus 900 that is shown in FIG. 9 may comprise at least a portion of an access point (such as base stations 810 and 820 depicted in FIG. 8), at least a portion of a user equipment (such as the user equipment 830 depicted in FIG. 8), at least a portion of a system controller (such as system controller 840 depicted in FIG. 8) and/or at least a portion of a transmitter system or a receiver system (such as the transmitter system 210 and the receiver system 250 that are depicted in FIG. 2). The apparatus 900 that is depicted in FIG. 9 can be resident within a wireless network and receive incoming data via, for example, one or more receivers and/or the appropriate reception and decoding circuitry (e.g., antennas, transceivers, demodulators and the like). The apparatus 900 that is depicted in FIG. 9 can also transmit outgoing data via, for example, one or more transmitters and/or the appropriate encoding and transmission circuitry (e.g., antennas, transceivers, modulators and the like). Additionally, or alternatively, the apparatus 900 that is depicted in FIG. 9 may be resident within a wired network.

FIG. 9 further illustrates that the apparatus 900 can include a memory 902 that can retain instructions for performing one or more operations, such as signal conditioning, analysis and the like. Additionally, the apparatus 900 of FIG. 9 may include a processor 904 that can execute instructions that are stored in the memory 902 and/or instructions that are received from another device. The instructions can relate to, for example, configuring or operating the apparatus 900 or a related communications apparatus. It should be noted that while the memory 902 that is depicted in FIG. 9 is shown as a single block, it may comprise two or more separate memories that constitute separate physical and/or logical units. In addition, the memory while being communicatively connected to the processor 904, may reside fully or partially outside of the apparatus 900 that is depicted in FIG. 9. It is also to be understood that one or more components or modules, such as the initialization code generators 801 and the sequence generators 802 that are shown in FIG. 8, can exist within a memory such as memory 902.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 900 of FIG. 9 can be employed with a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g. UE 830 in FIG. 8). In the alternative, the processor and the storage medium may reside as discrete components in a base station (e.g., base station 810 in FIG. 8). Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method, comprising:
transmitting a virtual cell identifier from a serving cell in a coordinated multi-point (CoMP) set to a user equipment (UE), wherein the virtual cell identifier is distinct from a cell identifier of the serving cell and is used for communications involving the CoMP set;
generating a UE-specific reference signal (UE-RS) sequence for the UE based at least in part on the virtual cell identifier; and
transmitting the UE-RS on a downlink channel.

2. The method of claim 1, further comprising:
transmitting the cell identifier of the serving cell.

3. The method of claim 2, further comprising:
generating a scrambling sequence based at least in part on the cell identifier of the serving cell;
scrambling data for downlink transmission based at least in part on the scrambling sequence; and
transmitting the scrambled data to the UE.

4. The method of claim 2, further comprising:
generating a second UE-RS sequence based at least in part on the cell identifier of the serving cell; and
transmitting the second UE-RS to a second UE.

5. The method of claim 1, wherein the UE-RS is generated without UE identification.

6. The method of claim 1, further comprising:
transmitting data scrambled with a scrambling sequence on a physical downlink shared channel (PDSCH), wherein the scrambling sequence is based at least in part on the cell identifier of the serving cell.

7. The method of claim 6, further comprising:
transmitting a virtual UE identifier from the serving cell, wherein the scrambling sequence is further based at least in part on the virtual UE identifier.

8. The method of claim 6, further comprising:
transmitting a codeword index and a transmission slot index from the serving cell, wherein the scrambling sequence is further based at least in part on the codeword index and the transmission slot index.

9. The method of claim 8, wherein the codeword index comprises one of a serving cell codeword index and a virtual codeword index, and the transmission slot index comprises one of a serving cell transmission slot index and a virtual transmission slot index.

10. The method of claim 1, further comprising:
receiving data scrambled with a scrambling sequence on a physical uplink shared channel (PUSCH), wherein the scrambling sequence is based at least in part on the cell identifier of the serving cell.

11. The method of claim 10, further comprising:
transmitting a virtual UE identifier from the serving cell, wherein the scrambling sequence is further based at least in part on the virtual UE identifier.

12. The method of claim 10, further comprising:
transmitting a transmission slot index from the serving cell, wherein the scrambling sequence is further based at least in part on the transmission slot index.

13. A communication device, comprising:
a processor; and
a memory comprising processor executable instructions that, when executed by the processor, configure the communication device to:
transmit a virtual cell identifier from a serving cell in a coordinated multi-point (CoMP) set to a user equipment (UE), wherein the virtual cell identifier is distinct from a cell identifier of the serving cell and is used for communications involving the CoMP set;
generate a UE-specific reference signal (UE-RS) sequence for the UE based at least in part on the virtual cell identifier; and
transmit the UE-RS on a downlink channel.

14. The communication device of claim 13, wherein the memory further comprises processor executable instructions that, when executed by the processor, configure the communication device to:
transmit the cell identifier of the serving cell.

15. The communication device of claim 14, wherein the memory further comprises processor executable instructions that, when executed by the processor, configure the communication device to:
generate a scrambling sequence based at least in part on the cell identifier of the serving cell;
scramble data for downlink transmission based at least in part on the scrambling sequence; and
transmit the scrambled data to the UE.

16. The communication device of claim 14, wherein the memory further comprises processor executable instructions that, when executed by the processor, configure the communication device to:
generate a second UE-RS sequence based at least in part on the cell identifier of the serving cell; and
transmit the second UE-RS to a second UE.

17. The communication device of claim 13, wherein the UE-RS is generated without UE identification.

18. The communication device of claim 13, wherein the memory further comprises processor executable instructions that, when executed by the processor, configure the communication device to:
transmit data scrambled with a scrambling sequence on a physical downlink shared channel (PDSCH), wherein the scrambling sequence is based at least in part on the cell identifier of the serving cell.

19. The communication device of claim 18, wherein the memory further comprises processor executable instructions that, when executed by the processor, configure the communication device to:
transmit a virtual UE identifier from the serving cell, wherein the scrambling sequence is further based at least in part on the virtual UE identifier.

20. The communication device of claim 18, wherein the memory further comprises processor executable instructions that, when executed by the processor, configure the communication device to:
transmit a codeword index and a transmission slot index from the serving cell, wherein the scrambling sequence is further based at least in part on the codeword index and the transmission slot index.

21. The communication device of claim 20, wherein the codeword index comprises one of a serving cell codeword index and a virtual codeword index, and the transmission slot index comprises one of a serving cell transmission slot index and a virtual transmission slot index.

22. The communication device of claim 13, wherein the memory further comprises processor executable instructions that, when executed by the processor, configure the communication device to:
receive data scrambled with a scrambling sequence on a physical uplink shared channel (PUSCH), wherein the scrambling sequence is based at least in part on the cell identifier of the serving cell.

23. The communication device of claim 22, wherein the memory further comprises processor executable instructions that, when executed by the processor, configure the communication device to:

transmit a virtual UE identifier from the serving cell, wherein the scrambling sequence is further based at least in part on the virtual UE identifier.

24. The communication device of claim 22, wherein the memory further comprises processor executable instructions that, when executed by the processor, configure the communication device to:
transmit a transmission slot index from the serving cell, wherein the scrambling sequence is further based at least in part on the transmission slot index.

25. A non-transitory computer-readable medium storing computer-executable program code, comprising:
program code for transmitting a virtual cell identifier from a serving cell in a coordinated multi-point (CoMP) set to a user equipment (UE), wherein the virtual cell identifier is distinct from a cell identifier of the serving cell and is used for communications involving the CoMP set;
program code for generating a UE-specific reference signal (UE-RS) sequence based at least in part on the virtual cell identifier; and
program code for transmitting the UE-RS on a downlink channel.

26. The non-transitory computer-readable medium of claim 25, wherein the computer-executable program code further comprises:
program code for transmitting the cell identifier of the serving cell.

27. The non-transitory computer-readable medium of claim 26, wherein the computer-executable program code further comprises:
program code for generating a scrambling sequence based at least in part on the cell identifier of the serving cell;
program code for scrambling data for downlink transmission based at least in part on the scrambling sequence; and
program code for transmitting the scrambled data to the UE.

28. The non-transitory computer-readable medium of claim 26, wherein the computer-executable program code further comprises:
program code for generating a second UE-RS sequence based at least in part on the cell identifier of the serving cell; and
program code for transmitting the second UE-RS to a second UE.

29. The non-transitory computer-readable medium of claim 25, wherein the UE-RS is generated without UE identification.

30. The non-transitory computer-readable medium of claim 25, wherein the computer-executable program code further comprises:
program code for transmitting data scrambled with a scrambling sequence on a physical downlink shared channel (PDSCH), wherein the scrambling sequence is based at least in part on the cell identifier of the serving cell.

31. The non-transitory computer-readable medium of claim 30, wherein the computer-executable program code further comprises:
program code for transmitting a virtual UE identifier from the serving cell, wherein the scrambling sequence is further based at least in part on the virtual UE identifier.

32. The non-transitory computer-readable medium of claim 30, wherein the computer-executable program code further comprises:
program code for transmitting a codeword index and a transmission slot index from the serving cell, wherein the scrambling sequence is further based at least in part on the codeword index and the transmission slot index.

33. The non-transitory computer-readable medium of claim 32, wherein the codeword index comprises one of a serving cell codeword index and a virtual codeword index, and the transmission slot index comprises one of a serving cell transmission slot index and a virtual transmission slot index.

34. The non-transitory computer-readable medium of claim 25, wherein the computer-executable program code further comprises:
program code for receiving data scrambled with a scrambling sequence on a physical uplink shared channel (PUSCH), wherein the scrambling sequence is based at least in part on the cell identifier of the serving cell.

35. The non-transitory computer-readable medium of claim 34, wherein the computer-executable program code further comprises:
program code for transmitting a virtual UE identifier from the serving cell, wherein the scrambling sequence is further based at least in part on the virtual UE identifier.

36. The non-transitory computer-readable medium of claim 34, wherein the computer-executable program code further comprises:
program code for transmitting a transmission slot index from the serving cell, wherein the scrambling sequence is further based at least in part on the transmission slot index.

37. A communication device, comprising:
means for transmitting a virtual cell identifier from a serving cell in a coordinated multi-point (CoMP) set to a user equipment (UE), wherein the virtual cell identifier is distinct from a cell identifier of the serving cell and is used for communications involving the CoMP set;
means for generating a UE-specific reference signal (UE-RS) sequence for the UE based at least in part on the virtual cell identifier; and
means for transmitting the UE-RS on a downlink channel.

38. The communication device of claim 37, further comprising:
means for transmitting the cell identifier of the serving cell.

39. The communication device of claim 38, further comprising:
means for generating a scrambling sequence based at least in part on the cell identifier of the serving cell;
means for scrambling data for downlink transmission based at least in part on the scrambling sequence; and
means for transmitting the scrambled data to the UE.

40. The communication device of claim 38, further comprising:
means for generating a second UE-RS sequence based at least in part on the cell identifier of the serving cell; and
means for transmitting the second UE-RS to a second UE.

41. The communication device of claim 37, wherein the UE-RS is generated without UE identification.

42. The communication device of claim 37, further comprising:
means for transmitting data scrambled with a scrambling sequence on a physical downlink shared channel (PDSCH), wherein the scrambling sequence is based at least in part on the cell identifier of the serving cell.

43. The communication device of claim 42, further comprising:
means for transmitting a virtual UE identifier from the serving cell, wherein the scrambling sequence is further based at least in part on the virtual UE identifier.

44. The communication device of claim 42, further comprising:
means for transmitting a codeword index and a transmission slot index from the serving cell, wherein the scrambling sequence is further based at least in part on the codeword index and the transmission slot index.

45. The communication device of claim 44, wherein the codeword index comprises one of a serving cell codeword index and a virtual codeword index, and the transmission slot index comprises one of a serving cell transmission slot index and a virtual transmission slot index.

46. The communication device of claim 37, further comprising:
  means for receiving data scrambled with a scrambling sequence on a physical uplink shared channel (PUSCH), wherein the scrambling sequence is based at least in part on the cell identifier of the serving cell.

47. The communication device of claim 46, further comprising:
  means for transmitting a virtual UE identifier from the serving cell, wherein the scrambling sequence is further based at least in part on the virtual UE identifier.

48. The communication device of claim 46, further comprising:
  means for transmitting a transmission slot index from the serving cell, wherein the scrambling sequence is further based at least in part on the transmission slot index.

* * * * *